United States Patent Office 3,222,415
Patented Dec. 7, 1965

3,222,415
PURIFICATION PROCESS
Herman S. Bloch, Skokie, Ill., assignor to Universal Oil Products Company, Des Plaines, Ill., a corporation of Delaware
No Drawing. Filed Oct. 16, 1961, Ser. No. 145,459
12 Claims. (Cl. 260—674)

This invention relates to a process for removing (1) hydrogen halide and (2) trace quantities of water from a substantially anhydrous fluid mixture containing the same, and more particularly relates to a process for removing (1) hydrogen halide and (2) trace quantities of water from a substantially anhydrous fluid mixture containing the same which comprises reacting such a fluid mixture with a metal carbide selected from the group consisting of aluminum carbide and manganese tritacarbide. Still more particularly, this invention relates to a process for removing (1) hydrogen halide and (2) trace quantities of water from a substantially anhydrous fluid mixture containing the same which comprises reacting such a fluid mixture with a metal carbide selected from the group consisting of aluminum carbide and manganese tritacarbide thereby reacting at least a portion of said hydrogen halide and said water with said carbide and subsequently recovering purified fluid.

I have found in the production of alkylated aromatic hydrocarbons utilizing a boron trifluoride-modified substantially anhydrous inorganic oxide, alkylatable aromatic hydrocarbon, olefin-acting compound, and boron trifluoride, that trace quantities of water sometimes are encountered in process streams per se or as coordination compounds of the boron trifluoride. The term "trace quantity of water" by way of definition means that quantity of water having a concentration of less than about 0.10 weight percent of said process stream.

The principal object of the present invention is to provide a process for the efficient and economical removal of the hydrogen halide and trace quantities of water contained in said hereinabove-mentioned process streams, and subsequently recovering purified fluid from said process inasmuch as purification of fluid streams is not feasible by conventional means when boron trifluoride together with water and/or hydrogen-fluoride are present. Another object of this invention is to provide a process whereby the hydrogen halide and water can be separated continuously from the hereinbefore mentioned process streams without appreciable consumption and loss of the recovered fluid. Other objects of this invention will be set forth hereinafter as part of the specifications and in the accompanying examples.

In one embodiment, the present invention relates to a process for removing (1) hydrogen halide and (2) trace quantities of water from a substantially anhydrous fluid mixture containing the same which comprises reacting such a fluid mixture with a metal carbide selected from the group consisting of aluminum carbide and manganese tritacarbide thereby reacting at least a portion of said hydrogen halide and said water with said carbide and subsequently recovering purified fluid.

Another embodiment of the present invention relates to a process for removing (1) hydrogen halide and (2) trace quantities of water from a substantially anhydrous fluid mixture containing the same which comprises reacting such a fluid mixture with aluminum carbide thereby reacting at least a portion of said hydrogen halide and said water with said carbide and subsequently recovering purified fluid.

A further embodiment of the present invention relates to a process for removing (1) hydrogen halide and (2) trace quantities of water from a substantially anhydrous fluid mixture containing the same which comprises reacting such a fluid mixture with manganese tritacarbide thereby reacting at least a portion of said hydrogen halide and said water with said carbide and subsequently recovering purified fluid.

A specific embodiment of the present invention relates to a process for removing (1) hydrogen fluoride and (2) trace quantities of water from a substantially anhydrous gaseous mixture containing the same which comprises reacting such a gaseous mixture with a metal carbide selected from the group consisting of aluminum carbide and manganese tritacarbide in a reaction zone at reaction conditions including a temperature of from about 75° to about 300° C. and a pressure of from about atmospheric to about 200 atmospheres, thereby reacting at least a portion of said hydrogen fluoride and said water with said carbide and subsequently recovering purified gas.

Another embodiment of the present invention relates to a process for removing (1) hydrogen halide and (2) trace quantities of water from a substantially anhydrous liquid hydrocarbon containing the same which comprises reacting such a liquid hydrocarbon with a metal carbide selected from the group consisting of aluminum carbide and manganese tritacarbide in a reaction zone at reaction conditions, thereby reacting at least a portion of said hydrogen halide and said water with said carbide and subsequently recovering purified hydrocarbon.

A further specific embodiment of the present invention relates to a process for removing (1) hydrogen fluoride and (2) trace quantities of water from substantially anhydrous liquid benzene containing the same which comprises reacting such liquid benzene with a metal carbide selected from the group consisting of aluminum carbide and manganese tritacarbide in a reaction zone at reaction conditions including a temperature of from about 75° to about 300° C. and a pressure of from about atmospheric to about 200 atmospheres, thereby reacting at least a portion of said hydrogen fluoride and said water with said carbide and subsequently recovering purified benzene.

Other embodiments of the present invention will become apparent in considering the specification as hereinafter set forth.

As set forth hereinabove, the present invention relates to a process for the removal of (1) hydrogen halide and (2) trace quantities of water from a fluid mixture utilizing a metal carbide selected from the group consisting of aluminum carbide and manganese tritacarbide as the removal agent. The trace quantities of water, as hereinbefore mentioned, sometimes are encountered per se or as coordination compounds of the boron trifluoride and/or hydrogen fluoride. These compounds have sometimes been encountered as the hydrates of boron trifluoride including boron trifluoride monohydrate, boron trifluoride dihydrate, boron trifluoride trihydrates, etc.

Few suitable metal carbides are utilizable as removal agents in the process of this invention. These compounds include such substances as aluminum carbide and manganese tritacarbide. Of the above-mentioned metal carbides, aluminum carbide is preferred for removing hydrogen halide and trace quantities of water from a substantially anhydrous fluid mixture containing the same. These metal carbides, under the conditions used, do not react with boron trifluoride and hence may be used to remove water and hydrogen halides from streams containing boron trifluoride.

Many fluid mixtures can be substantially purified utilizing the process of this invention. Suitable gaseous mixtures include such components as hydrogen, methane, ethane, propane, inert gases, etc. Suitable fluid organic compounds such as the hydrocarbons include those such as the paraffins, cycloparaffins, aromatics, etc. Suitable paraffins are normal butane, isobutane, normal pentane, isopentane, neopentane, normal hexane, etc. Suitable cycloparaffins are cyclopentane, methylcyclopentane, cyclohexane, methylcyclohexane, cycloheptane, cyclooctane, etc. Suitable aromatic hydrocarbons include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzenes, triethylbenzenes, normal propylbenzene, isopropylbenzene, etc. Preferred hydrocarbons are monocyclic aromatic hydrocarbons, that is, benzene hydrocarbons. Higher molecular weight alkyl aromatic hydrocarbons are also suitable. These include those aromatic hydrocarbons such as are produced by the alkylation of aromatic hydrocarbons with olefin polymers which are used as intermediates in the preparation of sulfonate surface-active agents. Such products are frequently referred to in the art as detergent alkylate, and include hexylbenzenes, nonylbenzenes, dodecylbenzenes, tridecylbenzenes, pentadecylbenzenes, hexyltoluenes, nonyltoluenes, dodecyltoluenes, pentadecyltoluenes, etc. Very often alkylate is obtained as a high boiling fraction in which the alkyl group attached to the aromatic nucleus varies in size from about $C_9$ to $C_{18}$. Other suitable aromatic hydrocarbons, which at specified removal conditions, depending upon the melting point of the aromatic chosen, would be in liquid form, would include those aromatic hydrocarbons with two or more aryl groups such as diphenyl, diphenylmethane, triphenyl, triphenylmethane, stilbene, etc. Examples of other aromatic hydrocarbons within the scope of this invention which at specified reaction conditions, depending upon melting point of the aromatic chosen, would be in liquid form, include those containing condensed aromatic rings. These include naphthalene, alkylnaphthalenes, fluorene, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

In accordance with the process of the present invention, the removal of (1) hydrogen halide and (2) trace quantities of water from a substantially anhydrous fluid mixture containing the same is effected by reacting such a fluid mixture with a metal carbide selected from the group consisting of aluminum carbide and manganese tritacarbide at a temperature of from about 75° C. or lower to about 300° C. or higher, and preferably from about 100° C. to about 250° C., although the exact temperature needed will depend upon the particular fluid to be purified, the particular metal carbide utilized, and the time of contact. The removal process is usually carried out at a pressure of from about atmospheric to about 200 atmospheres. The pressure utilized is usually selected to effect the desired reactions.

The reactions by which water and hydrogen halide are removed at the hereinabove mentioned reaction conditions are as follows when utilizing the aluminum carbide as the removal agent:

(1) $Al_4C_3 + 6H_2O \rightarrow 2Al_2O_3 + 3CH_4$
(2) $Al_4C_3 + 12HX \rightarrow 4AlX_3 + 3CH_4$ When hydrogen fluoride is the hydrogen halide occurring in the process system, the second equation is as follows:

(3) $Al_4C_3 + 12HF \rightarrow 4AlF_3 + 3CH_4$

As can be seen in Equations 1 through 3, the only products formed when utilizing aluminum carbide are inert methane and inert solids. As an alternative, manganese tritacarbide, $Mn_3C$, may be used instead of aluminum carbide. This material evolves methane and hydrogen on reaction with water at the specified reaction conditions. In this manner, water and hydrogen fluoride are removed, whereas hydrocarbon components and the boron fluoride remain unaffected.

In removing the hereinbefore described hydrogen halide and trace quantities of water from a fluid mixture containing the same with the type of removal media herein described, either batch or continuous operations may be employed. The actual operation of the process may be either upflow or downflow. The metal carbide removal agents may be utilized in the form of granules, grains, powders, particles, spheres, balls, tubular shapes, etc. The details of processes of this general character are familiar to those skilled in the art and any necessary additions or modifications of the above general procedures will be more or less obvious and can be made without departing from the broad scope of this invention.

The process of the present invention is illustrated by the following examples which are introduced for the purpose of illustration and with no intention of unduly limiting the generally broad scope of the invention.

*Example I*

This example illustrates the effect of the presence of trace quantities of water in process streams during the production of alkylated aromatics. The processing unit consisted of liquid and gas charge pumps, reactors, high pressure gas separators, pressure controllers, boron trifluoride treating system, feed pretreating system, fractionating columns, and liquid and gas collection systems. The catalyst charged into the reactor comprised a boron trifluoride-modified substantially anhydrous inorganic oxide, namely boron trifluoride-modified gamma-alumina. The unit was started up according to standard procedures so that ethylbenzene was produced. Substantially pure boron trifluoride was charged to the unit in sufficient quantity along with substantially anhydrous benzene and ethylene so that the benzene was converted to ethylbenzene. Additional boron trifluoride was added as needed to maintain good conversion. Operating temperatures were held at a minimum consistent with good conversion. The operating pressure was selected so that the benzene was kept substantially in the liquid phase. The aromatic to olefin ratio was kept at a maximum at all times consistent with the equipment limitations, in order that few polyethylbenzenes should form. The fractionation section first separated part of the benzene recycle by flash and then the remainder by fractionation. The maximum recycle possible was flashed because of the lower heat requirement for flashing until the ethylbenzene and heavier products present became a contamination factor. Most of the boron trifluoride present was in the effluent vapors. Part of this boron trifluoride was condensed with the benzene recycle and returned to the reactor. The remaining boron trifluoride passed into the boron trifluoride treating system where it was absorbed and returned to the reactor by compressor after being stripped from the absorbent. The liquid from the hot flash was sent to the benzene fractionating column where after removal of the remaining recycle benzene in the benzene column, the ethylbenzene and heavier products were fractionated into an ethylbenzene cut in the overhead of the ethylbenzene column, and a bottom cut. The overhead was sent to storage. The fractionator bottoms were recycled back to a second reactor where the polyethylbenzenes were transalkylated in the presence of benzene to produce ethylbenzene.

During the production of ethylbenzene in the hereinabove outlined process flow scheme, it was observed that trace quantities of water were encountered in the process streams per se and as coordination compounds of the boron trifluoride and/or hydrogen fluoride depending upon the amount of water present. The over-all efficiency of the alkylation process decreased as the concentration of these compounds became higher. Continued formation of these compounds caused the eventual shutdown of the plant.

*Example II*

This example illustrates the removal of (1) hydrogen halide and (2) trace quantities of water from a substantially anhydrous fluid mixture containing the same during the production of alkylated aromatics. The same processing unit described in the preceding example is utilized for the experiment described in this example.

The process flow scheme is modified so that a reaction zone containing aluminum carbide is introduced into a recycle boron fluoride gas stream comprising nitrogen, hydrogen, methane, and boron trifluoride. This substantially anhydrous gaseous mixture is passed downflow through the reaction zone at 500 p.s.i.g. and 110° C. Chemical analyses of the gaseous mixture before the reaction zone indicate the presence of hydrogen fluoride and trace quantities of water. Chemical analyses of the gaseous mixture after the reaction zone indicate substantial reaction occurring inasmuch as methane is evolved and the presence of hydrogen fluoride and water is not evident. The over-all efficiency of the alkylation process is maintained at the desired level with the reaction zone containing the granular bed of aluminum carbide in place as evidenced by the continuous production of ethylbenzene until the plant is shut down at the completion of the run. Upon completion of the run, chemical analyses of the removal agent, namely aluminum carbide, show that substantial consumption by direct chemical reaction occurs as indicated by the presence of aluminum oxide and aluminum fluoride.

*Example III*

This example illustrates the removal of (1) hydrogen halide and (2) trace quantities of water from a substantially anhydrous fluid mixture containing the same during the production of alkylated aromatics. The processing unit described in the preceding examples is utilized for the experiment described in this example.

The process flow scheme is modified so that a reaction zone containing manganese tritacarbide is introduced into the recycle benzene stream. This substantially anhydrous liquid mixture containing boron fluoride is passed upflow through the reaction zone at 500 p.s.i.g. and 110° C. Chemical analyses of this fluid mixture before the reaction zone indicate the presence of hydrogen fluoride and trace quantities of water. Chemical analyses of the gaseous mixture after the reaction zone indicate substantial reaction occurring inasmuch as methane is evolved and the presence of hydrogen fluoride and water is not evident. The over-all efficiency of the alkylation process is maintained at the desired level with the reaction zone containing the granular bed of manganese tritacarbide in place as evidenced by the continuous production of ethylbenzene until the plant is shut down at the completion of the run. Upon completion of the run, chemical analyses of the removal agent, namely, manganese tritacarbide, show that substantial consumption by chemical reaction occurs as indicated by the presence of manganese oxide and manganese fluoride.

*Example IV*

This example illustrates the removal of (1) hydrogen halide and (2) trace quantities of water from a substantially anhydrous fluid mixture containing the same during the production of alkylated aromatics. The same processing unit described in the preceding examples is utilized for the experiment described in this example.

The process flow scheme is modified so that a reaction zone containing aluminum carbide is introduced into the recycle benzene stream. This substantially anhydrous liquid mixture, containing dissolved boron trifluoride, is passed downflow through the reaction zone at 500 p.s.i.g. and 110° C. Chemical analyses of the liquid mixture before the reaction zone indicate the presence of hydrogen fluoride and trace quantities of water. Chemical analyses of the mixture after the reaction zone indicate substantial reaction occurring inasmuch as methane is evolved and the presence of hydrogen fluoride and water is not evident. The over-all efficiency of the alkylation process is maintained at the desired level with the reaction zone containing the granular bed of aluminum carbide in place as evidenced by the continuous production of ethylbenzene until the plant is shut down at the completion of the run. Upon completion of the run, chemical analyses of the removal agent, namely aluminum carbide, show that substantial consumption by direct chemical reaction occurs as indicated by the presence of aluminum oxide and aluminum fluoride.

Similar results are also obtained when aluminum carbide and manganese tritacarbide are utilized as removal agents in systems containing hydrogen chloride, hydrogen bromide, and hydrogen iodide. In the above-mentioned manner, water and hydrogen halide are removed, whereas hydrocarbon components and boron fluoride (where present) remain unaffected.

I claim as my invention:

1. A process for removing (1) hydrogen halide and (2) trace quantities of water from a substantially anhydrous fluid mixture containing the same which comprises contacting said fluid mixture with a metal carbide selected from the group consisting of aluminum carbide and manganese tritacarbide and reacting at least a portion of said hydrogen halide and said water with said carbide and subsequently recovering purified fluid.

2. A process for removing (1) hydrogen halide and (2) trace quantities of water from a substantially anhydrous fluid mixture containing the same which comprises contacting said fluid mixture with aluminum carbide and reacting at least a portion of said hydrogen halide and said water with said carbide and subsequently recovering purified fluid.

3. A process for removing (1) hydrogen halide and (2) trace quantities of water from a substantially anhydrous fluid mixture containing the same which comprises contacting said fluid mixture with manganese tritacarbide and reacting at least a portion of said hydrogen halide and said water with said carbide and subsequently recovering purified fluid.

4. A process for removing (1) hydrogen halide and (2) trace quantities of water from a substantially anhydrous gaseous mixture containing the same which comprises contacting said gaseous mixture with a metal carbide selected from the group consisting of aluminum carbide and manganese tritacarbide and reacting at least a portion of said hydrogen halide and said water with the said carbide and subsequently recovering purified gas.

5. A process for removing (1) hydrogen halide and (2) trace quantities of water from a substantially anhydrous liquid hydrocarbon containing the same which comprises contacting said liquid hydrocarbon with a metal carbide selected from the group consisting of aluminum carbide and manganese tritacarbide and reacting at least a portion of said hydrogen halide and said water with said carbide and subsequently recovering purified liquid hydrocarbon.

6. The process of claim 1 further characterized in that said contacting is effected at a temperature of from about 75° to about 300° C. and a pressure of from about atmospheric to about 200 atmospheres.

7. The process of claim 1 further characterized in that said hydrogen halide is hydrogen fluoride.

8. The process of claim 5 further characterized in that said contacting is effected at a temperature of from about 75° to about 300° C. and a pressure of from about atmospheric to about 200 atmospheres.

9. The process of claim 5 further characterized in that said hydrogen halide is hydrogen fluoride.

10. The process of claim 5 further characterized in that said substantially anhydrous liquid hydrocarbon is a liquid aromatic hydrocarbon.

11. The process of claim 5 further characterized in that said substantially anhydrous liquid hydrocarbon is a liquid benzene hydrocarbon.

12. The process of claim 5 further characterized in that said substantially anhydrous liquid hydrocarbon is liquid benzene.

References Cited by the Examiner

UNITED STATES PATENTS 2,481,208   9/1949   Eberle _____ 208—262
2,734,930   2/1956   Schlatter _____ 260—672

OTHER REFERENCES

Attack of Metal Carbides by Steam, Chem. Abstracts, vol. 48, columns 4420–1 (1954).

Kalichevsky et al.: Chemical Refining of Petroleum, Reinhold Publishing Corporation, New York, 1942, p. 236 relied on.

ALPHONSO D. SULLIVAN, *Primary Examiner.*